March 15, 1955  R. D. PIKE  2,704,239
PRODUCTION OF SODIUM BICARBONATE AND SODA ASH FROM TRONA
Filed June 1, 1951  3 Sheets-Sheet 2

INVENTOR.
ROBERT D. PIKE.
BY
Pollard & Johnston
ATTORNEYS

March 15, 1955 R. D. PIKE 2,704,239
PRODUCTION OF SODIUM BICARBONATE AND SODA ASH FROM TRONA
Filed June 1, 1951 3 Sheets-Sheet 3

INVENTOR.
ROBERT D. PIKE
BY Pollard & Johnston
ATTORNEYS

United States Patent Office 2,704,239
Patented Mar. 15, 1955

2,704,239

PRODUCTION OF SODIUM BICARBONATE AND SODA ASH FROM TRONA

Robert D. Pike, Greenwich, Conn.

Application June 1, 1951, Serial No. 229,437

10 Claims. (Cl. 23—64)

This invention relates to the production of soda ash from trona. In my Patent Number 2,346,140 granted April 11, 1944, I described and claimed the production of sodium sesquicarbonate from trona and the production of soda ash from the sesquicarbonate. The soda ash produced in this manner is of relatively lower density and in other ways does not correspond with the light soda ash produced by the Solvay ammonia soda process.

It is an object of the present invention to produce from raw trona of the Green River, Wyoming, region a light soda ash more nearly corresponding to the soda ash produced by the Solvay ammonia soda process.

Another object of my invention is to provide as an intermediate product in the conversion of trona to soda ash substanitally pure sodium bicarbonate.

Another object of my invention is to produce sodium bicarbonate instead of sodium sesquicarbonate as the purified intermediate crystalline product from a liquor containing the salts dissolved from trona, and to produce soda ash by calcination of the bicarbonate accompanied by the recovery and reuse of the carbon dioxide liberated during the calcination of the bicarbonate.

The process operates in a different region of the system $Na_2CO_3 \cdot NaHCO_3 \cdot H_2O$ than that employed in the process of my earlier Patent Number 2,346,140; for my present invention operates in a region of this system in which $NaHCO_3$ (sodium bicarbonate) is the stable crystal phase in the presence of the surrounding liquor, instead of in the region in which $Na_2CO_3 \cdot NaHCO_3 \cdot 2H_2O$ (sodium sesquicarbonate) is the stable crystal phase.

Various other objects and advantages of my invention will appear as this description proceeds.

In its broader concept, my invention may be considered to involve dissolving trona in a hot liquor containing sodium carbonate and sodium bicarbonate, treating the liquor either before or after said dissolution has taken place by introducing carbon dioxide therein whereby the bicarbonate content thereof is increased, next cooling and crystallizing out the sodium bicarbonate in the solution, then separating the same from the liquor and finally either recovering the sodium bicarbonate as such or calcining the same to produce soda ash.

More specifically, my invention involves dissolving raw trona in a hot recycle mother liquor containing a greater amount of $NaHCO_3$ in relation to $Na_2CO_3$ than is found in trona and at concentrations within that portion of the system $Na_2CO_3 \cdot NaHCO_3 \cdot H_2O$ hereinafter defined in which the $NaHCO_3$ is the stable crystal phase in the surrounding liquor such that $NaHCO_3$ only will be crystallized and recovered therefrom, next purifying the mother liquor containing the dissolved trona, then cooling or concentrating the said liquor to cause crystallization of the $NaHCO_3$ and at some stage of the process subjecting the liquor to a carbonating treatment to increase the $NaHCO_3$ content thereof. The crystalline $NaHCO_3$ separated from the mother liquor is calcined to produce light soda ash. It corresponds in physical characteristics to the light soda ash produced by the Solvay ammonia soda process. The $CO_2$ is preferably but not necessarily recovered and used to treat the recycle liquor to increase the $NaHCO_3$ content thereof.

The dissolution of the raw trona in the recycle mother liquor, the crystallization of the sodium bicarbonate from the pregnant liquor and the carbonation step can be carried out in other sequences and in other types of apparatus than that specifically described herein, but in order to illustrate the invention, I have shown on the accompanying drawings and in the examples given two preferred methods and procedures for practicing the invention.

In illustrating my process, I have chosen to operate in the system $Na_2CO_3 \cdot NaHCO_3 \cdot H_2O$, which also contains one pound NaCl per one hundred pounds $H_2O$. The natural NaCl content of the raw trona from the Green River, Wyoming, region has been found to be so low that only a very moderate removal of NaCl from the closed cycle of mother liquor of my process is necessary to keep the NaCl content of the mother liquor at a quantity not exceeding one pound NaCl per one hundred pounds $H_2O$. At this concentration I have found that it is unnecessary to wash the separated crystals of sodium bicarbonate preparatory to calcining in order to produce a very pure form of soda ash therefrom. The raw trona from the Green River, Wyoming, region has approximately the following composition:

| Constituent: | Per cent |
|---|---|
| $Na_2CO_3$ | 44.1 |
| $NaHCO_3$ | 34.69 |
| $H_2O$ | 14.95 |
| NaCl | .078 |
| $Fe_2O_3$ | .079 |
| $Na_2SO_4$ | .039 |
| $Na_2B_4O_7$ | .004 |
| Insolubles | 6.060 |

Example 1

Figure 1:
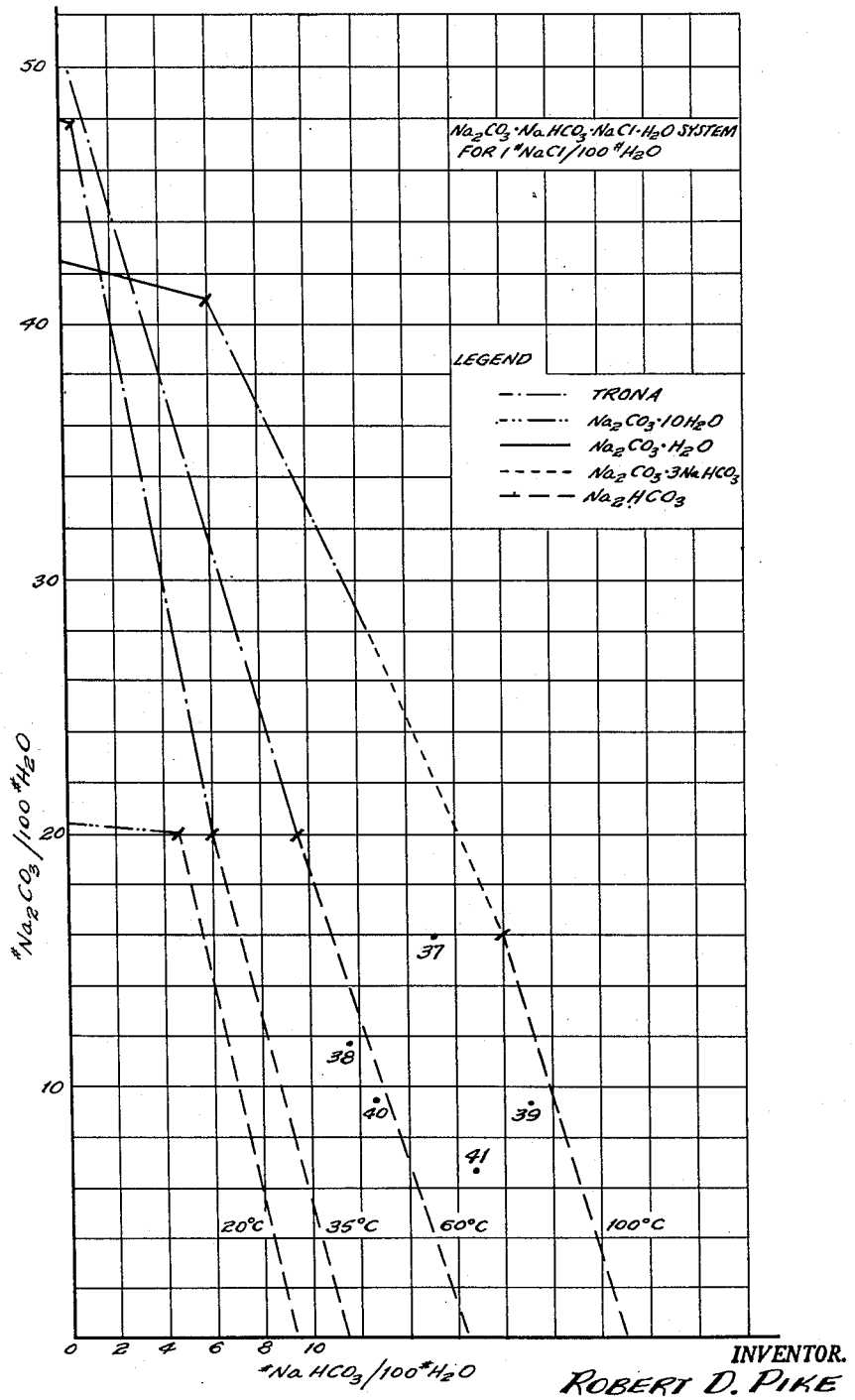
Fig. 1 illustrates the $Na_2CO_3 \cdot NaHCO_3 \cdot H_2O$ system including that portion made use of in the process of my invention.

Raw trona is dissolved in a mother liquor, recycled in the process, containing approximately 11.7 pounds $Na_2CO_3$ and 11.7 pounds $NaHCO_3$ and one pound NaCl per one hundred pounds of water at 85° C. The pregnant liquor formed is fed to the evaporators or crystallizers. The mother liquor of this composition dissolves approximately 4.3 pounds of $Na_2CO_3$ and 3.3 pounds of $NaHCO_3$ from the raw trona giving a pregnant liquor of approximately sixteen pounds $Na_2CO_3$ and fifteen pounds $NaHCO_3$ per one hundred pounds $H_2O$. This composition corresponds to the point 37 on the chart of Fig. 1. Crystallization without carbonating would lead to a yield of 4.3 pounds $Na_2CO_3$, leaving 11.7 pounds $Na_2CO_3$ in the liquor, and to a yield of 3.3 pounds $NaHCO_3$, leaving 11.7 pounds $NaHCO_3$ in the liquor per one hundred pounds $H_2O$. The carbonation treatment applied to the liquor in the evaporators prior to the crystallization step converts the 4.3 pounds $Na_2CO_3$ into 6.7 pounds $NaHCO_3$ which together with the 3.3 pounds $NaHCO_3$ dissolved from the raw trona provides a net yield of approximately ten pounds $NaHCO_3$ per one hundred pounds $H_2O$, recovered after carbonation and cooling in each cycle, and leaves approximately 11.7 pounds $Na_2CO_3$ and 11.7 pounds $NaHCO_3$ in the mother liquor to be recycled. This composition corresponds to point 38 on Fig. 1, at about 60° C. This shows an operating temperature range for the crystallizers of between 85° C. and 60° C. which is a satisfactory and economical range. In repeating the cycle, the mother liquor corresponding to the composition of point 38 on Fig. 1 is reheated to approximately 85° C. and is used to dissolve more raw trona, thus bringing it up to the composition of point 37 on Fig. 1. On each succeeding cycle of dissolution, carbonation and crystallization, approximately ten more pounds $NaHCO_3$ per one hundred pounds $H_2O$ will be recovered from the circulating solution.

Example 2

Raw trona is dissolved in a mother liquor containing 6.75 pounds $Na_2CO_3$ and 16.9 pounds $NaHCO_3$ per one hundred pounds $H_2O$ at a temperature of 100° C. and, allowing for 95% saturation, this produces a solution containing nineteen pounds $NaHCO_3$ and 9.5 pounds $Na_2CO_3$ per one hundred pounds $H_2O$, which corresponds to point 39 on Fig. 1. This solution is cooled to approximately 60° C. and the final composition of the solution becomes $NaHCO_3$, 12.5 pounds, $Na_2CO_3$, 9.5 pounds which corresponds to point 40 on Fig. 1 and due to crystallization, 6.5 pounds $NaHCO_3$ per one hundred pounds of water per cycle separate out. The solution remaining after separation of the crystals is then subjected to a carbonation treatment to convert a portion of the sodium carbonate to sodium bicarbonate and restore the solution to the original liquor composition.

The process may be carried out in stages by first heating and adding the $CO_2$ to the recycle mother liquor, then dissolving trona therein as illustrated by way of example and described hereinafter in connection with Fig. 3, and thereafter crystallizing and separating the sodium bicarbonate from the solution.

To produce 6.5 pounds $NaHCO_3$ per one hundred pounds $H_2O$ per cycle, there will be required 1.14 pounds $CO_2$ and 5.84 pounds sodium sesquicarbonate dissolved from the raw trona.

The addition of 1.14 pounds $CO_2$ to the solution indicated by the point 40 on Fig. 1 will convert 2.75 pounds of the $Na_2CO_3$ into 4.36 pounds $NaHCO_3$. After adding the $CO_2$, the solution will contain:

$Na_2CO_3$ 9.5—2.75=6.75 lbs. per 100 lbs. $H_2O$
$NaHCO_3$ 12.5+4.36=16.86 or approximately 16.9 lbs. per 100 lbs. $H_2O$ This composition corresponds to point 41 of Fig. 1 and a temperature of about 80° C. Some heat has to be added, therefore, in the carbonation step to increase the temperature and prevent crystallization and to permit the dissolution of the raw trona. I find it preferable, as described hereafter in connection with the flow sheet of Fig. 3, to add steam at the bottom of the carbonating tower to raise the temperature of the solution to 100° C.

In order to bring the concentration of this solution, corresponding to the point 41 on Fig. 1 to the concentration of the starting point 39 again, 5.84 pounds sodium sesquicarbonate containing 2.75 pounds $Na_2CO_3$ are dissolved from the raw trona, giving the composition:

$Na_2CO_3$ 6.75+2.75=9.5 lbs. per 100 lbs. water
$NaHCO_3$ 16.9+2.2=19.1 lbs. per 100 lbs. water From these examples it will be observed that the liquor used to dissolve the trona may contain substantially equal concentrations of the carbonate and bicarbonate but that the concentration of the bicarbonate may be substantially greater.

The process of Example 1 provides greater productivity per cycle and a lower consumption of fuel than Example 2. The process of Example 2, on the other hand, has the advantage that the carbonation is carried out in a separate operation in a carbonating tower instead of in the evaporators along with the cooling step as is done in the process of Example 1, and the second process is, therefore, the more practical application of the practice of my process.

Figure 2:
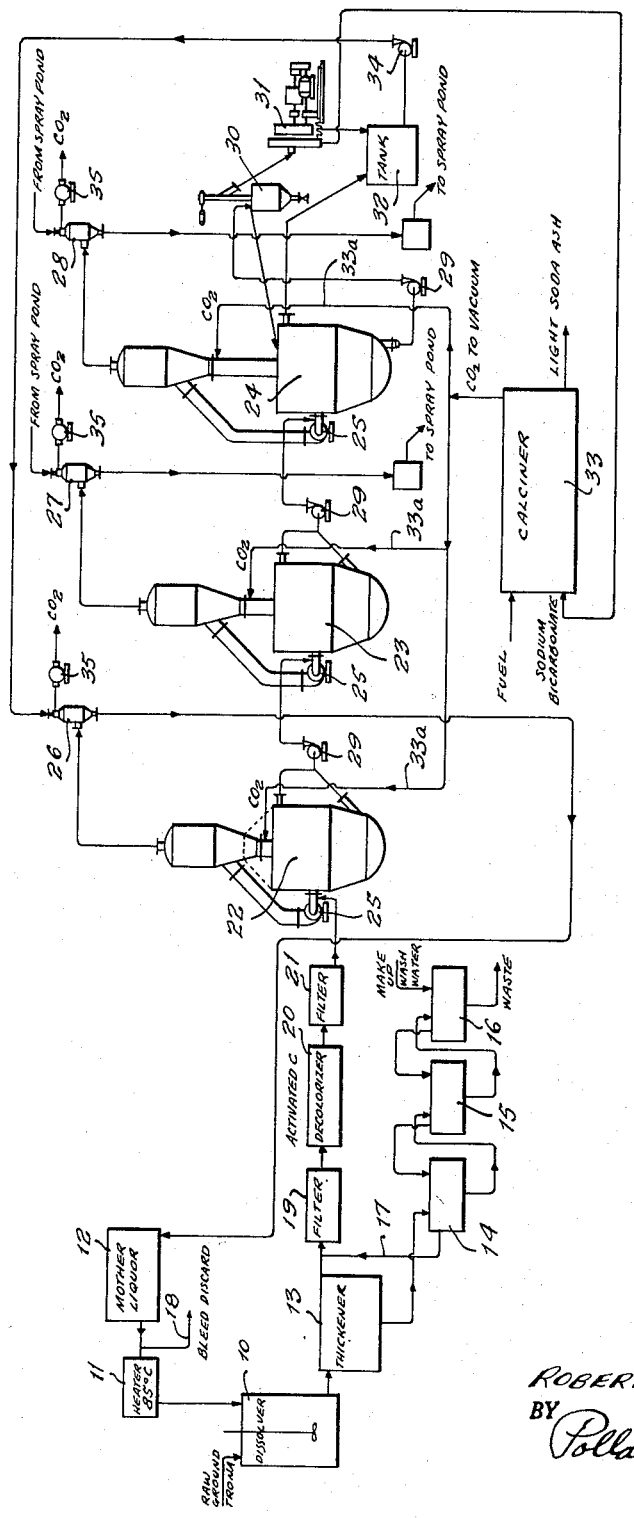
Fig. 2 is a diagrammatic flow sheet illustration of one procedure for carrying out the invention.
Figure 3:
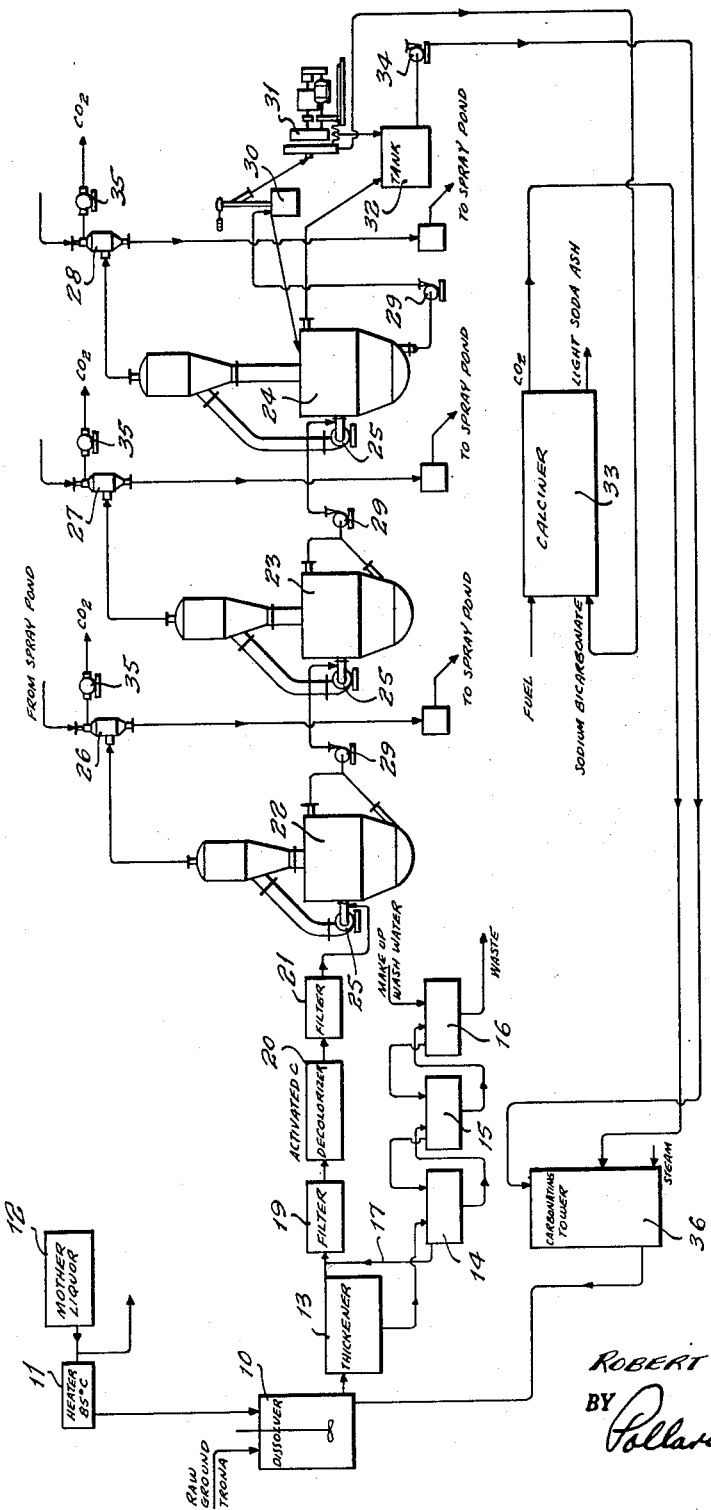
Fig. 3 is a diagrammatic flow sheet illustration of another procedure.

While the processes described above may be carried out in any desired sequence of steps and in various types of crystallizing or evaporating apparatus as long as the concentration requirements of the system shown on Fig. 1 are met, I have illustrated diagrammatically in Figs. 2 and 3 two procedures in flow sheet form and two suggested types of apparatus in which the steps of the invention may be economically carried out.

Referring now to Fig. 2 which is illustrative of the process of Example 1, raw trona, preferably ground to pass a 20 mesh screen, is introduced into a dissolver 10 where it meets a recycling stream of hot mother liquor suitably at about 85° C. This liquor comes from the steam heated heater 11 which in turn draws its supply from the recycle mother liquor storage tank 12 whose position with relation to the balance of the equipment will presently be described.

As the raw trona will contain on the average about 6% water-insoluble material, mostly shale, the first step in treating the effluent solution of dissolver 10 is that of clarification. This may be done in any suitable manner but I have indicated in Fig. 2 that the effluent solution passes to a thickener 13, suitably of the Dorr type, the underflow of which passes through a series of countercurrent decantation thickeners 14, 15, 16. The under-flow from thickener 16 is waste. Water for make up purposes and washing is introduced into thickener 16, as shown, and flows countercurrent to the flow of the solids after which it joins the main stream of pregnant solution by passage through the conduit 17. The main stream then passes through the filter 19, and thence into a steam heated tank 20 where activated carbon is added for purposes of decolorization and removing organic matter. The solution is then passed to and through filter 21 where the spent activated carbon is removed, leaving a water white solution.

The solution leaving the filter 21 is fed to effect 22 of a triple effect series of vacuum crystallizers, the other two effects being 23 and 24. These vacuum crystallizers may be of any suitable or known design. Each of the effects is provided with a circulating centrifugal pump 25 and a barometric condenser 26, 27 or 28. Slurry pumps 29 move the crystal slurry through the crystallizers in the chosen direction and the finished slurry is removed from effect 24 and passes to a slurry feeder 30. The overflow from feeder 30 returns to effect 24 and the slurry passes on to centrifuge 31, the clear effluent of which goes to the liquor storage tank 32. The tank 32 also receives some clarified mother liquor directly from effect 24. There is a progressively lower vacuum pulling from effects 24 to 23 as compared with that pulling from effect 22, the last effect 24 having the highest vacuum and the lowest temperature of boiling.

When operating according to my invention, the crystals produced are pure sodium bicarbonate and these are conveyed to a calciner 33 of conventional type used for calcining sodium bicarbonate, and as a result, light soda ash is produced along with pure $CO_2$ gas. The $CO_2$ is preferably recovered and sufficient of the $CO_2$ is introduced by means of conduit 33a into each of the effects 22, 23 and 24 to convert the desired amount of sodium carbonate to sodium bicarbonate. The effluent recirculating mother liquor from tank 32 is delivered by pump 34 to barometric condenser 26 which serves effect 22. The vacuum pumps 35, one of which serves each of the effects, removes whatever $CO_2$ has not been absorbed in the liquor in the evaporators. The mother liquor from the barometric condenser 26, at a temperature which suitably may approximate 75° C., flows directly to recycle mother liquor storage tank 12, then to heater 11, and finally back to the dissolver 10, thus completing the cycle.

A portion of the recirculating mother liquor is preferably discharged at outlet 18 although it may be led off at any other point. The purpose of this liquor removal is to maintain the content of NaCl at a concentration not exceeding one pound per one hundred pounds water. The discharged solution can, of course, be treated by any well known method for the recovery of its content of sodium carbonate.

Referring now to Fig. 3 of the drawing, the process here illustrated is essentially similar to that of Fig. 2 except that the mother liquor from effect 24, instead of going to the barometric condenser of effect 22, as it does in Fig. 2, flows to the top of a carbonating tower 36 into which steam enters at the bottom to heat the recirculating mother liquor suitably to 100° C., and except that the $CO_2$ from the calciner 33 is introduced into the carbonating tower 36 at an intermediate point between top and bottom thereof. The hot mother liquor flowing from the bottom of the carbonating tower flows directly to dissolver 10, although it may for convenience be held temporarily in the recycle mother liquor storage tank 12, and from the dissolver 10 it flows through the apparatus in essentially the same manner as described in connection with Fig. 2.

The amount of carbonation may be altered to produce the desired amount of sodium bicarbonate to sodium carbonate in the circulating solution by controlling the amount of carbon dioxide flowing to the tower 36 or to the effects or crystallizers 22, 23 and 24.

The light soda ash produced by the calcination of the sodium bicarbonate has the physical properties ordinarily associated with light ammonia soda ash but it may, if desired, be densified in a well known manner to produce heavy soda ash.

While I have given two examples and illustrated two procedures for practicing my invention, it will be understood that the invention may be practiced using other concentrations and conditions, following other procedures

I claim:

1. A recycling system for the production of sodium bicarbonate from crude trona by crystallization of sodium bicarbonate from an aqueous solution of trona which comprises dissolving crude trona in an unsaturated aqueous mother solution of sodium carbonate and sodium bicarbonate composed principally of a recycled solution of sodium carbonate and sodium bicarbonate at a temperature between about 20 and 100° C., the proportion of sodium bicarbonate to sodium carbonate in said mother solution at equilibrium ranging by weight from at least about 4.6:20 at 20° C. to at least about 18:16 at 100° C., adding CO₂ to the system during each cycle in an amount substantially equal to the amount necessary to convert the sodium carbonate of the trona dissolved during said cycle into sodium bicarbonate and to maintain the recycling aqueous solution of said cycle containing the dissolved trona in a concentration within the $$Na_2CO_3 \cdot NaHCO_3 \cdot H_2O$$

system at which sodium bicarbonate is the stable crystal phase in the surrounding liquor, crystallizing sodium bicarbonate from the solution containing the dissolved trona, separating the crystallized sodium bicarbonate from the system, and returning the resulting mother liquor to the system for recycling.

2. A recycling system for the production of sodium carbonate from crude trona by first crystallizing sodium bicarbonate from an aqueous solution of trona which comprises dissolving crude trona in an unsaturated aqueous mother solution of sodium carbonate and sodium bicarbonate composed principally of a recycled solution of sodium carbonate and sodium bicarbonate at a temperature substantially in excess of 60° C but not substantially in excess of 100° C., the proportion of sodium bicarbonate to sodium carbonate in said mother solution at equilibrium ranging by weight from at least about 9.5:20 at 60° C. to at least about 18:16 at 100° C., adding CO₂ to the system during each cycle in an amount substantially equal to the amount necessary to convert the sodium carbonate of the trona dissolved during said cycle into sodium bicarbonate and to maintain the recycling aqueous solution of said cycle containing the dissoluved trona in a concentration within the $$Na_2CO_3 \cdot NaHCO_3 \cdot H_2O$$

system at which sodium bicarbonate is the stable crystal phase in the surrounding liquor, crystallizing sodium bicarbonate from the solution containing the dissolved trona by cooling said solution to a temperature not below 60° C., separating the crystallized sodium bicarbonate from the system, returning the resulting mother liquor to the system for recycling, and calcining the separated sodium bicarbonate to produce light soda ash.

3. A recycling system for the production of sodium bicarbonate from naturally occurring trona, carrying organic matter, by crystallization of sodium bicarbonate from an aqueous solution of trona which comprises dissolving said trona in an unsaturated aqueous mother solution of sodium carbonate and sodium bicarbonate composed principally of a recycled solution of sodium carbonae and sodium bicarbonate at a temperature between about 20 and 100° C., the proportion of sodium bicarbonate to sodium carbonate in said mother solution at equilibrium ranging by weight from at least about 4.6:20 at 20° C. to at least about 18:16 at 100° C., contacting the solution with an adsorbent and thereby removing said organic matter, separating the solution from said adsorbent and organic matter, adding CO₂ to the system during each cycle in an amount substantially equal to the amount necessary to convert the sodium carbonate of the trona dissolved during said cycle into sodium bicarbonate and to maintain the recycling aqueous solution of said cycle containing the dissolved trona in a concentration within the $Na_2CO_3 \cdot NaHCO_3 \cdot H_2O$ system at which sodium bicarbonate is the stable crystal phase in the surrounding liquor, crystallizing sodium bicarbonate from the solution containing the dissolved trona, separating the crystallized sodium bicarbonate from the system, and returning the resulting mother liquor to the system for recycling.

4. A recycling system for the production of sodium bicarbonate from Wyoming trona, carrying insoluble material and coloring material, by crystallization of sodium bicarbonate from an aqueous solution of said trona which comprises dissolving trona in an unsaturated aqueous mother solution of sodium carbonate and sodium bicarbonate composed principally of a recycled solution of sodium carbonate and sodium bicarbonate at a temperature between about 20 and 100° C., the proportion of sodium bicarbonate to sodium carbonate in said mother solution at equilibrium ranging by weight from at least about 4.6:20 at 20° C. to at least about 18:16 at 100° C., removing the insoluble material from said solution, contacting the solution with an adsorbent and removing the adsorbent and coloring matter from said solution, adding CO₂ to the system during each cycle in an amount substantially equal to the amount necessary to convert the sodium carbonate of the trona dissolved during said cycle into sodium bicarbonate and to maintain the recycling aqueous solution of said cycle containing the dissolved trona in a concentration within the $$Na_2CO_3 \cdot NaHCO_3 \cdot H_2O$$

system at which sodium bicarbonate is the stable crystal phase in the surrounding liquor, crystallizing sodium bicarbonate from the solution containing the dissolved trona, separating sodium chloride from the resulting mother liquor present in excess of one pound per 100 pounds thereof, and returning the resulting mother liquor having a salt content not in excess of one pound per 100 pounds thereof to the system for recycling.

5. The method of producing sodium bicarbonate from trona which comprises dissolving trona in a hot unsaturated recycle mother liquor containing sodium carbonate and sodium bicarbonate, the weight of the bicarbonate being substantially at least as much as the carbonate, introducing carbon dioxide into the liquor in a quantity substantially increasing the sodium bicarbonate content thereof to a concentration within that portion of the system, $Na_2CO_3 \cdot NaHCO_3 \cdot H_2O$, in which sodium bicarbonate is the stable crystal phase in contact with the pregnant liquor formed, crystallizing and removing sodium bicarbonate from the pregnant liquor, leaving the mother liquor for recycling in the process.

6. The method of producing soda ash from trona which comprises dissolving trona in a hot unsaturated recycle liquor containing sodium carbonate and sodium bicarbonate, the weight of the bicarbonate being substantially at least as much as the carbonate, introducing carbon dioxide into said liquor in a quantity substantially increasing the sodium bicarbonate content thereof to a concentration within that portion of the system, $$Na_2CO_3 \cdot NaHCO_3 \cdot H_2O$$

in which sodium bicarbonate is the stable crystal phase in contact with the concentrated liquor formed, removing crystallized sodium bicarbonate from said liquor, leaving liquor for recycling in the process, and calcining said sodium bicarbonate to produce soda ash.

7. The method of producing soda ash from trona which comprises dissolving trona in a hot unsaturated recycle liquor containing sodium carbonate and sodium bicarbonate, the weight of the bicarbonate being substantially at least as much as the carbonate, introducing carbon dioxide into said liquor in a quantity substantially increasing the sodium bicarbonate content thereof to a concentration within that portion of the system, $$Na_2CO_3 \cdot NaHCO_3 \cdot H_2O$$

in which sodium bicarbonate is the stable crystal phase in contact with the concentrated liquor formed, removing crystallized sodium bicarbonate from said concentrated liquor, leaving the liquor for recycling in the process, calcining said sodium bicarbonate to produce soda ash and carbon dioxide and using said carbon dioxide to produce more bicarbonate in the liquor.

8. A process for producing sodium bicarbonate from Wyoming trona, comprising dissolving the trona in a hot unsaturated recycle liquor containing sodium carbonate and sodium bicarbonate, the weight of the bicarbonate being substantially at least as much as the carbonate, removing insoluble impurities from the resulting liquor, treating the clarified liquor with an adsorbent, filtering to remove the adsorbent and organic matter taken up therein, introducing CO₂ into the liquor while cooling and crypstallizing sodium bicarbonate in a quantity converting the dissolved sodium carbonate of the trona into sodium bicarbonate and increasing the sodium bicarbonate content of the liquor to a concentration within that portion of the system, $Na_2CO_3 \cdot NaHCO_3 \cdot H_2O$, in which sodium bicarbonate is the stable crystal phase in contact with the saturated liquor, removing the said crystals leaving a liquor for recycling in the process, calcining the crystals to produce soda ash and $CO_2$, reheating the recycle liquor and dissolving more trona therein.

9. A process for producing light soda ash of conventional physical properties from trona containing crystallized sodium sesquicarbonate, comprising dissolving the trona in a hot unsaturated recycle liquor containing substantially equal concentrations of sodium carbonate and sodium bicarbonate, cooling the resulting concentrated liquor while adding $CO_2$ in a quantity forming a liquor within that portion of the system, $$Na_2CO_3 \cdot NaHCO_3 \cdot H_2O$$

wherein sodium bicarbonate is the stable crystal phase thereby forming and crystallizing sodium bicarbonate, removing the said crystals from the residual liquor and calcining them to produce soda ash and $CO_2$, and heating the motor liquor preparatory to recycling and dissolving more trona.

10. A method for producing substantially pure commercial soda ash from trona which comprises, dissolving trona in a hot unsaturated recycle liquor containing sodium carbonate and sodium bicarbonate, the weight of the bicarbonate being substantially at least as much as the carbonate, introducing carbon dioxide into said liquor in a quantity substantially increasing the sodium bicarbonate content thereof and providing a concentration within that portion of the system, $Na_2CO_3 \cdot NaHCO_3 \cdot H_2O$, in which sodium bicarbonate is the stable crystal phase in contact with the concentrated liquor formed, crystallizing and removing sodium biarbonate from the pregnant liquor, calcining the sodium bicarbonate crystals without theretofore washing the same thereby producing soda ash, separating from the mother liquor obtained any sodium chloride dissolved out of the trona in excess of one pound per one hundred pounds of water in said mother liquor and recycling said liquor in the process.

References Cited in the file of this patent

UNITED STATES PATENTS

| 1,319,128 | Watson et al. | Oct. 21, 1919 |
| 1,618,834 | Kuhnert | Feb. 22, 1927 |
| 1,865,832 | Chesny | July 5, 1932 |
| 1,865,833 | Chesny | July 5, 1932 |
| 1,911,794 | Britton | May 30, 1933 |
| 2,161,711 | Keep et al. | June 6, 1939 |
| 2,193,817 | Houghton | Mar. 19, 1940 |
| 2,346,140 | Pike | Apr. 11, 1944 |
| 2,388,009 | Pike | Oct. 30, 1945 |
| 2,528,481 | Wiseman | Oct. 30, 1950 |

FOREIGN PATENTS

| 188,335 | Great Britain | July 5, 1923 |